US007079076B2

(12) United States Patent  
Monthéard et al.

(10) Patent No.: US 7,079,076 B2  
(45) Date of Patent: Jul. 18, 2006

(54) METHOD OF DETERMINING THE POSITION OF A RADIO-FREQUENCY SIGNAL RECEIVER WITHOUT KNOWLEDGE OF THE INITIAL APPROXIMATE POSITION, AND RECEIVER FOR IMPLEMENTING THE SAME

(75) Inventors: Anne Monthéard, Eclépens (CH); Fanel Piccini, Chambrelien (CH); Emil Zellweger, Lommiswil (CH)

(73) Assignee: Asulab S.A., Marin (CH)

( * ) Notice: Subject to any disclaimer, the term of this patent is extended or adjusted under 35 U.S.C. 154(b) by 0 days.

(21) Appl. No.: 11/206,169

(22) Filed: Aug. 18, 2005

(65) Prior Publication Data

US 2006/0119506 A1 Jun. 8, 2006

(30) Foreign Application Priority Data

Aug. 20, 2004 (EP) .................................. 04104022

(51) Int. Cl.  
*G01S 5/14* (2006.01)

(52) U.S. Cl. .............................. 342/357.15; 342/357.12
(58) Field of Classification Search ........... 342/357.15, 342/357.12, 357.13  
See application file for complete search history.

(56) References Cited

U.S. PATENT DOCUMENTS 6,121,923 A * 9/2000 King ..................... 342/357.12

6,184,824 B1 * 2/2001 Bode et al. ............ 342/357.15

FOREIGN PATENT DOCUMENTS

DE 196 33 477 A1 2/1998  
WO WO 2004/011957 A1 2/2004

* cited by examiner

Primary Examiner—Thomas H. Tarcza  
Assistant Examiner—Fred H. Mull  
(74) Attorney, Agent, or Firm—Sughrue Mion, PLLC

(57) ABSTRACT

The method of determining the position of a radio-frequency signal receiver consists first of all in dividing the Earth's surface into N geographical regions as a function of the N channels available in the correlation stage of the receiver. At least one satellite in projection onto the Earth's surface has to be located in each of the N defined regions. The N channels of the correlation stage are each configured and switched on to search for a visible satellite in one of the N respective regions. Radio-frequency signal reception and shaping means pick up said radio-frequency signals and frequency convert them to provide intermediate signals to the correlation stage. Once one of the channels has detected a visible satellite in one of the N regions, the operation of all the other channels is interrupted by a stop block located in each of the other channels. Subsequently, certain other channels are configured and switched on for searching and tracking visible satellites in proximity to the first detected visible satellite. This allows precise position and time calculations to be made in the microprocessor means of the receiver. An approximate position is calculated as soon as at least four satellites are tracked by a direct method, before calculating the precise position of the receiver by a conventional iterative method.

10 Claims, 3 Drawing Sheets

METHOD OF DETERMINING THE POSITION OF A RADIO-FREQUENCY SIGNAL RECEIVER WITHOUT KNOWLEDGE OF THE INITIAL APPROXIMATE POSITION, AND RECEIVER FOR IMPLEMENTING THE SAME

This application claims priority from European Patent Application 04104022.1 filed Aug. 20, 2004, the entire disclosure of which is incorporated herein by reference

FIELD OF THE INVENTION

The invention concerns a method of determining the position of a radio-frequency signal receiver, in particular of the GPS type, without any knowledge of the initial approximate position. In order to do this, the receiver comprises reception and shaping means for radio-frequency signals from satellites. These signal shaping means produce intermediate signals, which are frequency converted, for a correlation stage. The correlation stage is formed of N correlation channels for receiving the intermediate signals in order to correlate them with replicas of the carrier frequency and specific codes of satellites to be searched and tracked. Microprocessor means of the receiver are connected to the correlation stage for processing the data drawn, after correlation, from the radio-frequency signals, and for controlling the operation of certain parts of the receiver.

The invention also concerns the radio-frequency signal receiver which is suitable for implementing the method.

The approximate position means also determines a coarse position for a geographical region or area for example where the receiver is before the calculation of a precise or fine position.

The radio-frequency signal receiver can be used in a satellite navigation system, for example of the GLONASS or GALILEO or GPS type.

BACKGROUND OF THE INVENTION

In the case of a GPS system, any radio-frequency signal receiver can receive signals from satellites in orbit. The ground distance between the receiver and a visible satellite can be from 20,000 km, when one of the satellites is at zenith, to 26,000 km, when one of the satellites is at a tangential point with the surface of the Earth, i.e. on the horizon.

Currently, 30 satellites are placed in orbit at a distance close to 20,200 km above the surface of the Earth on 6 orbital planes each inclined by 55° with respect to the Equator. The time taken by a satellite to complete one revolution in orbit in order to return to the same point above the Earth is approximately 12 hours. The distribution of the satellites in orbit allows a terrestrial GPS receiver to receive the GPS signals from at least four visible satellites to determine its position, speed and the local time for example.

For civilian applications, each of these satellites transmits radio-frequency signals formed in particular of a first carrier frequency at 1.57542 GHz on which the P-code is modulated at 10.23 MHz and C/A PRN code is modulated at 1.023 MHZ peculiar to each satellite with the GPS message at 50 Hz. This GPS message contains the ephemerides and almanac data used particularly for calculating the X, Y Z position, speed and local time.

The C/A PRN code (pseudo random noise) of each satellite, which is a Gold code, is a unique pseudo random code for each satellite so that the signals transmitted by the satellites can be differentiated inside the receiver. The C/A code is a digital signal composed of 1023 chips, and which is repeated every millisecond. All of the Gold codes have the characteristic of being almost orthogonal, i.e. by correlating them with each other, the correlation result gives a value close to 0. This characteristic allows several radio-frequency signals from several satellites to be simultaneously processed independently in several channels of the same GPS receiver.

In current navigation systems that use GPS type receivers, it is often necessary to introduce an initial approximate position to facilitate the calculation of the precise position of the receiver. Consequently, this requires the receiver user to enter for example the coordinates of a place stored in proximity to his current position, which is a drawback.

In the patent application DE 196 33 477, it is described means for a radio frequency signal receiver allowing the receiver to effect a first search of a first set of satellites without any knowledge of the initial approximate position. In order to do this, search channels of the receiver are configured for the search of a certain number of satellites from at least two orbital planes sensibly perpendicular so that the signals from at least are visible satellite can be picked up by the receiver.

Since it is envisaged to mount such radio-frequency signal receivers in portable objects, such as cellular telephones or also in wristwatches, all of the precise position calculation operations must be facilitated. Moreover, the electric power consumption during these calculation operations must be greatly reduced, given that the receiver is powered in such objects by an accumulator or battery of small size.

SUMMARY OF THE INVENTION

It is thus a main object of the invention to overcome the drawbacks of the prior art by proposing a method of determining the position of a radio-frequency signal receiver without it being necessary to enter an initial approximate position into the receiver for calculating its precise position.

The invention therefore concerns a method of determining the position of a radio-frequency signal receiver, particular of the aforecited GPS type, which comprises the features mentioned in claim 1.

Particular steps of the method are defined in the dependent claims 2 to 6.

One advantage of the radio-frequency signal receiver position determining method of the invention lies in the fact that initially, the N correlation channels are configured and switched on at the same time to each search for a satellite in one of the N geographical regions or areas defined in accordance with the almanac and ephemerides stored in the receiver. In this way, as soon as one of the N channels has detected a satellite whose projection onto the surface of the Earth is within one of the N regions, it is possible to determine in which part of the globe, or even in which region the receiver is located. Moreover, owing of the first satellite, information can be drawn as to the UTC (coordinated universal time).

Another advantage of the receiver position determination method according to the invention lies in the fact that after detection of the first satellite, at least three other visible satellites in proximity to the first detected satellite are searched by three other channels of the correlation stage. Once the 4 satellites are tracked by the 4 channels, an approximate position can be calculated by the microprocessor means by a direct method (for example the Bancroft method). If this method does not provide a solution, by knowing the position of each satellite in orbit, the position of the receiver can be roughly calculated by a mean of the latitudes and longitudes of each satellite tracked at a fixed height above sea level. In this way, an approximate position can advantageously be used for the final calculation of the precise position using a conventional iterative method.

Since the receiver is preferably mounted in a wristwatch case, which includes a battery or accumulator of small size, the microprocessor means comprise an 8-bit microprocessor. With such a low power-consuming microprocessor, the calculation time must be reduced particularly in order to limit electric power consumption. Owing to the approximate position calculation via the direct method, this allows the number of iterations of the iterative method to be reduced in order to converge more quickly on the precise position data. Thus, with such a low power-consuming microprocessor, the problem of limit cycles leading to a false position value can be avoided. Without the approximate position calculation, multiple calculation operation iterations of the iterative method lead to an inaccurate determination of the receiver position arising from the problem of limit cycles. This problem of limit cycles encountered with such an 8-bit microprocessor can be due for example to a clock impulse lost during the position calculation.

The invention also concerns a radio-frequency signal receiver suitable for implementing the method which comprises the features mentioned in claim 7.

Advantageous embodiments of the receiver are defined in the dependent claims 8 to 10.

One advantage of the radio-frequency signal receiver according to the invention lies in the fact that each channel of the correlation stage comprises a stop block for interrupting the operation of the channel upon the command of the microprocessor. Each stop block receives clock signals generated by a clock signal generator in the radio-frequency signal shaping and reception means. In a normal state, each stop block allows the clock signals to clock the operations of one correlator and one controller of the channel that is operation. However, for example when a first satellite has been detected by one of the N channels operating, each other channel has to be stopped owing to the stop block which has the task of turning off the clock signals clocking the channel operations.

In order to save energy, one could envisage deliberately turning off certain parts of the reception and shaping means by time periods. Despite this momentary turning off of the reception and shaping means, the code replica generation method remains in operation in the correlation stage.

BRIEF DESCRIPTION OF THE DRAWINGS

The objects, advantages and features of the radio-frequency signal receiver position determination method and the receiver for implementing the same will appear more clearly in the following description made with reference to the drawings, in which.

DESCRIPTION OF PREFERRED EMBODIMENTS

In the following description, the receiver suitable for implementing the method of determining its geographical position is preferably a GPS receiver. Several of the elements of the GPS radio-frequency signal receiver, which are well known to those skilled in this technical field, are only described in a simplified manner. The receiver could nonetheless also be used in a GLONASS or GALILEO navigation system or another navigation system. Owing to the method according to the invention, the receiver is capable of determining its geographical position accurately without any knowledge of an initial approximate position (cold start).

The GPS receiver can preferably be fitted to a portable object, such as a wristwatch in order to provide position, speed and local time data as required to the wearer of the watch. Since the watch has an accumulator or battery of small size, the power consumed when the GPS receiver is operating must be as low as possible.

Of course, the GPS receiver could be fitted to other low power-consuming portable objects of small size, such as portable telephones, which are also provided with an energy accumulator or battery.

Figure 2:
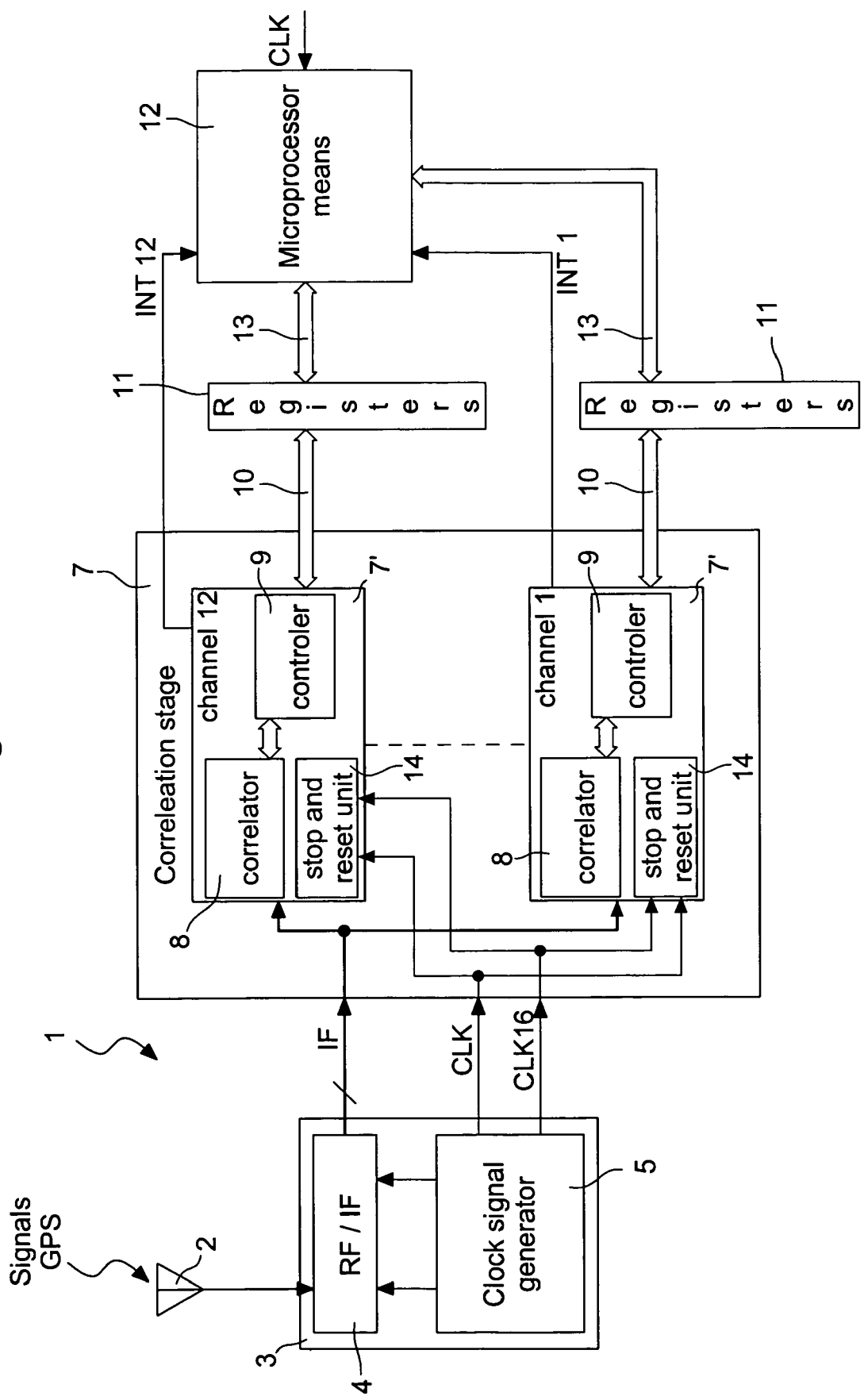
FIG. 2 shows schematically the various parts of a radio-frequency signal receiver suitable for implementing the method according to the invention.

GPS receiver 1 suitable for implementing the method is schematically shown in FIG. 2. It includes mainly reception and shaping means for radio-frequency signals 3 provided by an antenna 2 for generating 4-bit frequency converted intermediate signals IF, a correlation stage 7 formed of 12 channels 7' for receiving the intermediate signals IF. A data transfer bus 10 connects each channel to a respective buffer register 11, and finally a data bus 13 connects each buffer register to microprocessor means 12 for the position calculation operations of receiver 1.

Figure 1:
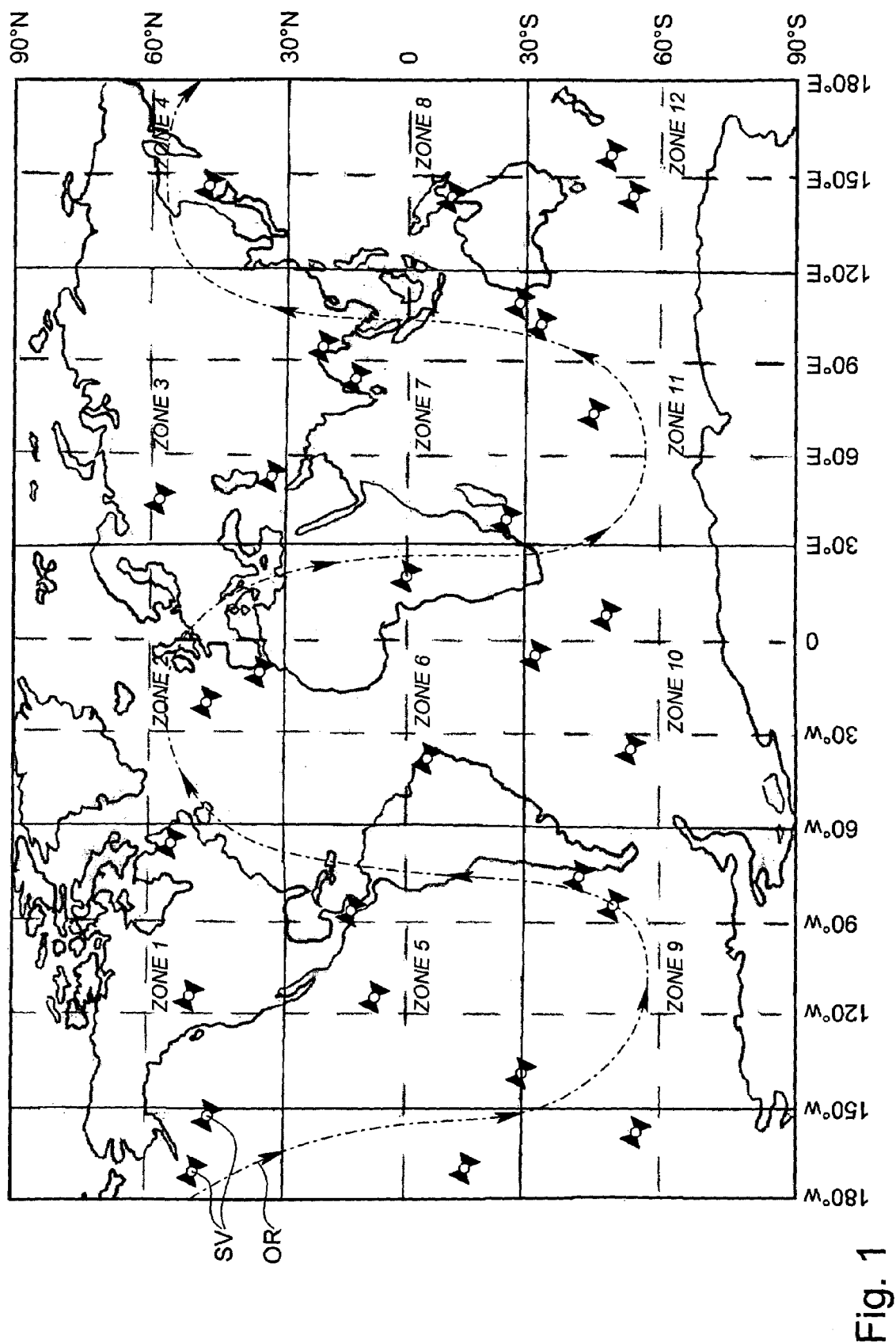
FIG. 1 shows in a simplified manner a plan view of the Earth with N defined geographical regions or areas and a projection of the satellites in orbit in each region at a given moment for implementation of the method according to the invention.

Reference will now be made to FIG. 1 to describe the method according to the invention, the surface of the Earth is divided into N geographical regions or areas as a function of the N channels available in the receiver correlation stage. Since the GPS receiver comprises 12 channels in the correlation stage, the surface of the Earth is thus divided into 12 geographical regions or areas. These areas are defined in accordance with an almanac stored in the receiver so that at least one satellite to be acquired is located, in projection onto the Earth's surface, in each of the 12 areas. Via the method described hereinafter, it is possible to accurately determine the position of the GPS receiver without it being necessary to enter an initial approximate position into the receiver.

FIG. 1 shows at a given moment the projection onto the Earth's surface of 30 satellites SV capable of being used in the near future, even though currently 29 satellites are operating for determining the position of a GPS receiver. It will be noted that as a function of the 12 defined areas, more than one satellite is located in each of the 12 areas at any given time. In order to avoid overloading FIG. 1, only an outline OR of the path of one of the satellites on one of 6 orbits is shown in projection on the Earth's surface.

In the table below, the geographic cover of the 12 areas defined by the almanac stored in the receiver is shown:

|  | Latitudes | Longitudes | Centre |
| --- | --- | --- | --- |
| Zone 1 (North America) | 90°N-30°N | 150°W-60°W | 60°N, 105°W |
| Zone 2 (Europe) | 90°N-30°N | 60°W-30°E | 60°N, 15°W |
| Zone 3 (Russia) | 90°N-30°N | 30°E-120°E | 60°N, 75°E |
| Zone 4 (Japan) | 90°N-30°N | 120°E-150°W | 60°N, 165°E |

-continued

|  | Latitudes | Longitudes | Centre |
|---|---|---|---|
| Zone 5 (Central America) | 30°N-30°S | 150°W-60°W | 0, 105°W |
| Zone 6 (Africa) | 30°N-30°S | 60°W-30°E | 0, 15°W |
| Zone 7 (Indian Ocean) | 30°N-30°S | 30°E-120°E | 0, 75°E |
| Zone 8 (Indonesia) | 30°N-30°S | 120°E-150°W | 0, 165°E |
| Zone 9 (South America) | 30°N-90°S | 150°W-60°W | 60°S, 105°W |
| Zone 10 (South Africa) | 30°N-90°S | 60°W-30°E | 60°S, 15°W |
| Zone 11 (Antarctica) | 30°N-90°S | 30°E-120°E | 60°S, 75°E |
| Zone 12 (Australia) | 30°N-90°S | 120°E-150°W | 60°S, 165°E |

It should be noted that even if the almanac is not continually updated, it is possible to roughly determine the position of each satellite in orbit above each of the 12 areas. Each channel can be configured if possible for searching for a satellite at the highest elevation in each area. i.e. a satellite at the zenith with respect to the receiver or at the centre of each area.

Once the 12 areas have been defined, the microprocessor means configure and control the switching-on of the 12 channels of the correlation stage. The 12 channels are configured such that each channel searches for a visible satellite in one of the 12 respective areas.

As soon as one of the channels operating detects a visible satellite, the operation of all the other channels is interrupted via the microprocessor means. This interruption of the other channels occurs at the moment when the microprocessor means have received the first interruption signal from the channel that detected the first satellite as explained hereinbelow with reference to FIG. 2. With the first satellite being tracked by one of the channels, it is possible to find the UTC and the geographic area in which the receiver is located.

Once the first satellite is tracked by one of the channels of the correlation stage, the microprocessor means supply data via the buffer registers to configure a certain number of other channels. At least three other channels of the correlation stage are configured and switched on by the microprocessor means to search for visible satellites in proximity to the first satellite tracked by the first channel operating. In this way the radio-frequency signals transmitted by these satellites are less likely to encounter an obstacle on their path to the receiver in order to calculate a precise geographical position.

Of course more than 4 channels can be switched on to pick up more than 4 visible satellites. However, in order to save energy, it may be sufficient to track 4 visible satellites to make a precise calculation of the receiver's geographical position.

In order to calculate the receiver's position precisely, after at least 4 satellites are tracked by at least 4 of the correlation stage channels, a direct calculation method is first of all used to estimate a coarse or approximate position of the receiver. This method allows the different position calculation equations to be linearized subsequently.

After the coarse position estimate, the precise position calculation is achieved by a conventional iterative method, which consists in carrying out multiple iterations. This number of iterations is greatly reduced owing to the prior coarse receiver position calculation by the direct method, which avoids the problem of inaccuracy due to limit cycles.

In order to make the approximate position calculation, the calculation method described by Stephen Bancroft in the article entitled "An Algebraic Solution of the GPS Equations", drawn from the review IEEE Transactions on Aerospace and Electronic Systems, Vol. AES-21, No. 7 January 1985. This method constructs an algebraic equation of the $2^{nd}$ degree from observed pseudo-distances. The resolution of this equation provides two solutions for the position, one of which is aberrant and has to be dismissed. However, if no proper calculation result is given by the Bancroft method, a calculation of the means of the latitudes $\phi_i$ and longitudes $\lambda_i$ of the various tracked satellites at a height equal to O which corresponds to the sea level. As the position of each satellite in orbit is known in accordance with the ECEF system (Earth Centred Earth Fixed Cartesian Coordinates) with respect to the centre of the Earth, it is easy to convert the position of each satellite in latitude, longitude and elevation from sea level.

The approximate position via this direct method thus consists in finding the mean of the latitudes $\phi_i$ and longitudes $\lambda_i$ of the satellites tracked by the channels using the following formulae: $\phi=(1/n)\Sigma_i\phi_i$ and $\lambda=(1/n)\Sigma_i\lambda_i$ where n is the number of tracked satellites, for example 4 tracked satellites.

In order to implement the method described hereinbefore, all of the elements forming the radio-frequency signal receiver 1 are explained in more detail with reference to FIG. 2.

As mentioned hereinbefore, radio-frequency signal reception and shaping means 3 produce 4-bit intermediate signals IF, which are preferably in a complex form. These intermediate signals IF are composed of an in-phase signal component I and a quarter-phase signal component Q at a frequency lower than or equal to 400 kHz. The complex intermediate signals IF are represented in FIG. 2 by a bold line intersected by an oblique bar defining 4 bits.

In a preferred embodiment, the number N of channels 7' available in receiver 1 must be higher than the maximum number of visible satellites at any point of the Earth. Consequently, correlation stage 7 is formed of 12 channels 7' capable of being able to work in parallel.

Conventionally, in reception means 3, an electronic circuit 4 converts first all the radio-frequency signals from frequency 1.57542 GHz into a frequency for example of 24.6 MHz. The RF/IF electronic circuit 4 then proceeds to a conversion to bring the GPS signals to a frequency for example of 400 kHz or lower by sampling at 4.03 MHz. Complex intermediate signals IF sampled and quantified at a frequency lower than or equal to 400 kHz are thus provided to channels 7' of correlation stage 7.

For the frequency conversion operations, a clock signal generator 5 forms part of radio-frequency signal reception and shaping means 3. This generator is provided for example with a quartz oscillator that is not shown, calibrated at a frequency of the order of 16.2 MHz. Two clock signals CLK and CLK16 are provided to correlation stage 7 and to microprocessor means 12 in order to clock all the operations of these elements. The first clock frequency CLK can have a value of 4.03 MHz, whereas the second clock frequency can be fixed at 16 times lower, i.e. at 252.4 kHz used for a large part of the correlation stage in order to save on energy consumption.

It should be noted that it is possible to envisage obtaining the clock signal CLK16 using a divider placed in correlation stage 7 instead of being integrated with the clock signal generator 5 in reception means 3.

The signals supplied by circuit 4 give, in half of all cases, signals of different parity (+1 and −+). This parity must thus be taken into account for the demodulation operations of the GPS signals in the receiver. In a variant, circuit 4 can give signals distributed over 4 output bits for the in-phase component and the quarter-phase component.

The registers 11 of each channel are capable of receiving configuration data or parameters from the microprocessor means. Each channel is capable of transmitting, via the registers, data concerning the GPS messages, the state of the PRN code, the frequency increment relating to the Doppler effect, the pseudo-distances and other data after correlation and locking onto a specific satellite.

The buffer registers 11 are composed of several sorts of registers which are for example control and state registers, channel NCO (numerically controlled oscillator) registers, pseudo-distance registers, carrier and code shift and increment registers and test registers. It should be noted that these registers can accumulate data during the correlation phase in order to be used during the satellite acquisition and tracking procedures without necessarily being automatically transferred to the microprocessor means.

In a variant, a single block of registers 11 can be envisaged for all of the channels 7' of the correlation stage, given that certain data placed in the register block is common to each channel.

Each channel 7' of correlation stage 7 includes a correlator 8 and a controller 9 for starting, via a dedicated material, the signal processing algorithm for acquiring the satellite signal and tracking the satellite detected by the channel. Each channel 7' also comprises a stop and reset block 14 which receives clock signals CLK and CLK16 from clock signal generator 5 for clocking the various operations in correlator 8 and controller 9. This stop block 14 interrupts the operation of correlator 8 and controller 9 upon the command of the microprocessor means turning off the clock signals intended therefore.

When receiver 1 is initially switched on, all of channels 7' of correlation stage 7 are configured by microprocessor means 12 to each search for a satellite in one of the 12 defined geographical areas. The configuration of each channel consists in entering therein various parameters relating to the carrier frequency and PRN code of a specific satellite to be searched and tracked.

As explained hereinbefore in the method of determining the precise position of the receiver, as soon as one of the channels has detected a first visible satellite, the operation of all the other channels must be interrupted. In order to do this, the operating channels 7' transmit interruption signals INT1 to INT12 to microprocessor 12 to warn the latter of the data that it can extract.

As soon as it receives interruption signals, the microprocessor generally has to run through all the channels to discover which channel the data to be extracted is coming from. This data may concern for example configuration parameters, GPS messages, the state of the PRN code, the Doppler effect frequency increment, pseudo-distances, reception means turn off modes, the state of counter integrators and other information.

In the present case, channel 7' that detected the first satellite transmits an interruption signal INT to the microprocessor so that a command to interrupt the operation of the other channels is transmitted to each stop block 14 of the other channels. In this way, clock signals CLK and CLK16 of the other channels are momentarily turned off.

At least three other channels 7' must be configured and switched on by the microprocessor means to search for visible satellites close to the first detected satellite. Consequently, 4 channels are operating to each track one of the 4 visible satellites necessary for calculating the receiver's position. In such case several interruption signals INT1 to INT12 can occur at the same time and be transmitted to microprocessor means 12. The microprocessor means can also comprise a priority decoder that is not shown for the operating channels 7'. Thus, the microprocessor can directly access a priority channel transmitting an interruption signal in accordance with a determined order of priority.

In another embodiment that is not shown, the priority decoder could also be integrated in the correlation stage.

Controller 9 of each channel includes, amongst other elements, a memory unit, an arithmetical unit, a data bit synchronisation unit, a correlator control unit and an interruption unit that are not visible in FIG. 2. The memory unit is composed of a RAM memory for storing momentary data. The RAM memory is distributed in an irregular or regular structure. The arithmetical unit carries out addition, subtraction, multiplication, accumulation and shift operations.

All of the detected satellite acquisition and tracking operations are thus carried out autonomously in each respective channel of the correlation stage in a parallel bit architecture where the calculation of several bits is carried out in one clock impulse. The digital signals are at 1 kHz which allows autonomous processing of said carrier frequency and PRN code slave loop signals at a lower frequency rate. When one channel has locked onto a satellite, the circuit synchronises the flow of GPS data for subsequent calculations.

Thus, the transfer of data with microprocessor means 12 no longer occurs during all of the correlation steps. It is only the correlation result of each channel 7' of correlation stage 7 which is transferred to the microprocessor, in particular the GPS messages at a frequency of 50 Hz. This has the effect of greatly reducing the current consumption.

Consequently, microprocessor means 12 preferably comprise an 8-bit CoolRISC-816 microprocessor from EM Microelectronic-Marin SA, Switzerland. This microprocessor is clocked by a clock signal at 4.03 MHz. Microprocessor means 12 also comprise storage means that are not shown in which all the information concerning the position of said satellites, their Gold code, and those which are able to be seen by the terrestrial GPS receiver are stored.

Owing to the method according to the invention via which an approximate position is first of all calculated by a direct method, the problem of limit cycles for calculating the precise position in an 8-bit microprocessor is avoided. The number of iterations by the iterative method for calculating the precise position is thus reduced.

It should be noted that in addition to the power consumption reduction noted with the distribution of software tasks in the correlation stage, an additional power consumption reduction can be achieved by active coasting—deliberately turning off certain parts of reception and shaping means 3 by periods of time. Despite this momentary turning off of reception and shaping means 3, the method of generating code replica in the correlation stage remains in operation.

Figure 3:
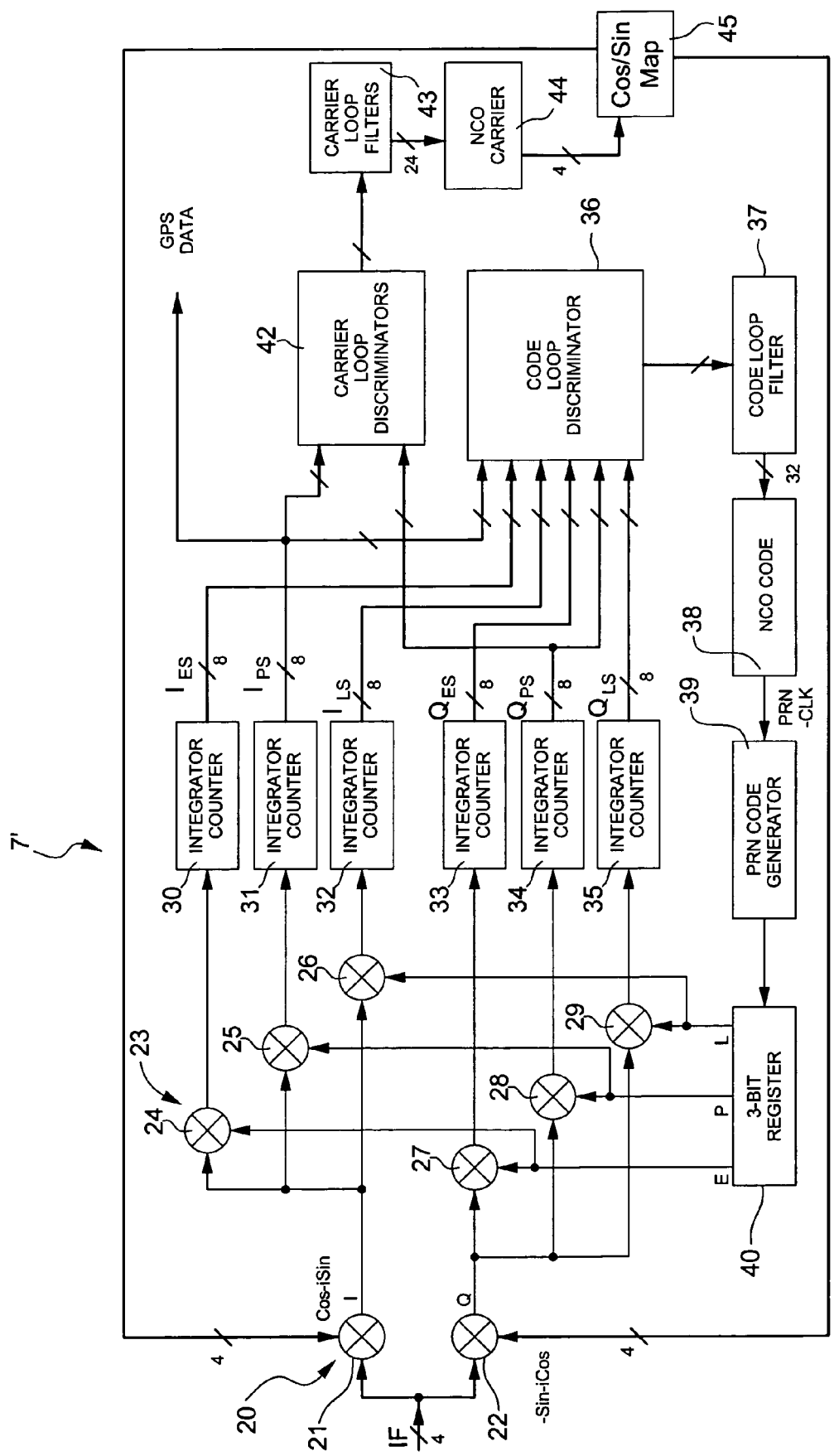
FIG. 3 shows schematically the elements of a correlator of one channel of the receiver correlation stage suitable for implementing the method according to the invention.

In FIG. 3, the correlator is shown with a part for the PRN code slave loop and another part for the carrier frequency slave loop. The correlator is identical in each correlation stage channel, but can be configured differently in each channel. For more details relating to the various elements of the correlator, the reader can refer to the teaching drawn from the book "Understanding GPS Principles and Applications" at chapter 5 by Philip Ward and the editor Elliott D. Kaplan (Artech House Publishers, USA 1996) edition number ISBN 0-89006-793-7 and particularly Figures 5.8 and 5.13.

With reference to FIG. 3, intermediate signals IF, represented in the Figure by a bold line intersected by an oblique bar defining 4 bits, are complex signals (I+iQ) composed of an in phase component I and a quarter-phase component Q. Said intermediate signals IF have been sampled and quantified, and are first passed through first mixers 20 of the carrier. A mixer or multiplier 21 multiplies signals IF by the cosine minus i times the sine of the internally generated carrier replica in order to extract the in-phase signal I from the complex signals, while a mixer or multiplier 22 multiplies signals IF by minus sine less i times the cosine of the internally generated carrier replica in order to extract the quarter-phase signal Q from the complex signals.

These sin and cos signals originate from a block 45 of a COS/SIN table of the replica signal. The object of this first step in the first mixers 20 is to extract the carrier frequency from the signals carrying the GPS message.

After this operation the PRN code equivalent of the signals from a satellite to be acquired has to be found in a switched on channel with a PRN code generated in said channel corresponding to the desired satellite. In order to do this, the in-phase and quarter-phase signals pass through second mixers 23 to correlate signals I and Q with an early replica, a prompt replica and a late replica of the PRN code to obtain six correlated signals.

Of course only the early and late replica could have been kept in each channel of the correlation stage without taking account of the prompt replica in order to minimise the number of correlation elements. However, by removing the prompt component from the code control loop, a signal to noise ratio loss of the order of 2.5 dB is observed.

Mixer or multiplier 24 receives signal I and early replica signal E from a 3-bit register 40 and provides an early in-phase correlated signal. Mixer or multiplier 25 receives signal I and prompt replica signal P from register 40 and provides a prompt in-phase correlated signal. Mixer or multiplier 26 receives signal I and the late replica signal L and provides a late in-phase correlated signal.

Mixer or multiplier 27 receives signal Q and early replica signal E and provides an early quarter-phase correlated signal. Mixer or multiplier 28 receives signal Q and prompt replica signal P and provides a prompt quarter-phase correlated signal. Finally, mixer or multiplier 29 receives signal Q and late replica signal L and provides a late quarter-phase correlated signal.

The gap between early replica E and late replica L is a half chip in the embodiment of the present invention, which means that the gap with a prompt central component P is ¼ chip. The multipliers can be made by simplification using XOR logic gates for example.

The six correlated signals each enter into one of the counter integrators 30 to 35 which are pre-detection elements, whose binary output words $I_{ES}$, $I_{PS}$, $I_{LS}$, $Q_{ES}$, $Q_{PS}$ and $Q_{LS}$ are generally represented over 14 bits. The number of bits of the binary output word of the counter integrators defines the receiver's reception dynamic. It is defined to be able to count to a number 1023, which is equivalent to the number of chips of the PRN code. Each counter integrator 30 to 35 of a channel selected by the microprocessor means at the start of a search is configured to provide a complete set of binary words $I_{ES}$, $I_{PS}$, $I_{LS}$, $Q_{ES}$, $Q_{PS}$ and $Q_{LS}$ every millisecond. However, in order to remove a part of the noise from the useful signal to be demodulated, only the 87 heavy bits are used for the rest of the digital signal processing chain.

The output binary words $I_{ES}$, $I_{PS}$, $I_{LS}$, $Q_{ES}$, $Q_{PS}$ and $Q_{LS}$ represented in FIG. 3 by a bold line intersected by an oblique bar defining 8 bits, are passed into a code loop discriminator 36 and into a code loop filter 37. The code loop discriminator 36 performs the energy calculation operations for signals $I_{ES}$, $I_{PS}$, $I_{LS}$, $Q_{ES}$, $Q_{PS}$ and $Q_{LS}$. An accumulation of values during a certain number M of integration cycles, for example 10 cycles, is made in the code discriminator.

Discriminator 36 can be non-coherent of the delay lock loop (DLL) type. It is formed in particular by an 8-bit multiplier and by a 20-bit accumulator. In this discriminator, a correction is brought from the carrier loop, since when the signal is transmitted by the satellite the Doppler effect is felt not only on the carrier frequency, but also on the PRN code which is modulated on the carrier frequency. Bringing the carrier into the code loop discriminator corresponds to a division by 1540 of the carrier shift increment.

Depending upon the result filtered from the discriminator, a phase increment is imposed by the 32-bit NCO oscillator 38 to PRN code generator 39 so that it transmits the series of PRN code bits to register 40 to carry out a new correlation. The frequency resolution of this 32-bit NCO is of the order of 0.9 mHz (for a clock frequency of 4.03 MHz).

The various loop results are processed by the controller in order to coordinate the acquisition and tracking operations. Once there is synchronisation and locking onto the desired satellite, the values $I_{ES}$ and $I_{LS}$ are entered into a demodulation element 50. This element 50 is capable of providing the data message at 50 Hz over 1 bit via the data input and output register to the microprocessor means. In addition to the message, the microprocessor means can take the information concerning pseudo-distances inserted in the buffer register in order to calculate the X, Y and Z position, speed and precise local time.

None of the elements explained hereinbefore will be explained in more detail, since they form part of the general knowledge of those skilled in this particular technical field.

Binary words $I_{PS}$ and $Q_{PS}$ are introduced at a frequency of 1 kHz into carrier loop discriminators 42 (envelope detection) to calculate the energy from the signals followed by carrier loop filters 43. The assembly formed by the carrier loop discriminators 42 and carrier loop filters 43 can be achieved as described in the article entitled "Performance Comparisons Between FLL, PLL and a Novel FLL-Assisted-PLL Carrier Tracking Loop Under RF Interference Conditions" by Philip W. Ward.

A mean operation is carried out on the frequency and phase discriminators in order to increase the sensitivity and precision of the carrier tracking loops. The accumulation provided in the discriminators lasts for a number M of cycles, for example 10 cycles for the PLL and 5 cycles for the FLL.

After the result of discriminators 42 and after passage through filters 43, the 24-bit NCO oscillator of carrier 44 receives a frequency increment (bin) for correction of the carrier frequency replica. This 24-bit NCO has frequency resolution of the order of 240 mHz and provides data on 4 bits to the Cos/Sin table 45.

The two code and carrier control methods are synchronised during tracking, although the carrier tracking loops are only updated after confirmation of the presence of the satellite signal.

From the description that has just been given, multiple variants of the method or receiver for implementing the same can be conceived by those skilled in the art without departing from the scope of the invention defined by the claims. After detection of the first satellite, it may be possible to calculate elevations around this first satellite in order to provide a receiver approximate position. The radio-frequency signal receiver can comprise a minimum of 4 channels in the correlation stage, or more than 12 channels. The stop block in each channel can be formed of a single switch followed by dividers for generating the two clock signals for clocking operations in the channel.

What is claimed is:

1. A method of determining the position of a radio-frequency signal receiver, the receiver including means for receiving and shaping radio-frequency signals from satellites to generate frequency converted intermediate signals, a correlation stage composed of N correlation channels for receiving the intermediate signals in order to correlate them with specific code and carrier frequency replicas from satellites to be searched and tracked, and microprocessor means connected to the correlation stage for processing the data drawn, after correlation, from the radio-frequency signals, wherein the method includes a series of steps consisting in:

dividing the surface of the Earth into N geographical regions as a function of the N channels available in the correlation stage such that, according to an almanac stored in the receiver, at least one satellite to be acquired is located, in projection onto the surface of the Earth, in each of the N regions, switching on the N channels of the correlation stage, the N channels each being configured to search one visible satellite in one of the N respective regions, as soon as one of the channels has detected a visible satellite in one of the N regions, interrupting the operation of all the other channels, and configuring and switching on certain other channels for the search and tracking of visible satellites in proximity to the first visible satellite detected to perform the time and position calculating operations in the microprocessor means.

2. The method according to claim 1, wherein an approximate position of the receiver is calculated first of all by a direct method as soon as at least four satellites are detected and tracked respectively by four channels of the correlation stage, and in that a precise position of the receiver is determined on the basis of the approximate position by an iterative method in the microprocessor means.

3. The method according to claim 2, wherein the receiver approximate position is calculated for a height located at sea level on the basis of the mean latitude $\phi_i$ and longitude $\lambda_i$ data of the satellites being tracked by the operating channels using the following formulae:

$$\phi=(1/n)\Sigma_i\phi_i \text{ and } \lambda=(1/n)\Sigma_i\lambda_i$$

where n is the number of satellites being tracked.

4. The method according to claim 1, wherein after the step of dividing the surface of the Earth into N geographical regions, N being an integer number greater than or equal to 4 and preferably equal to 12, the N channels of the correlation stage are switched on to each search for a satellite in one of the respective regions having the highest elevation, particularly the satellites located in projection onto the Earth's surface in proximity to the centre of each region.

5. The method according to claim 1, wherein, as soon as one of the N switched on channels has detected a first visible satellite in one of the N regions, an interruption signal is transmitted by the channel having detected the first visible satellite, to the microprocessor means such that said means interrupt the operation of the all the other channels.

6. The method according to claim 1, for which each channel of the correlation stage comprises a stop block for interrupting the operating channel clock signals and reinitialising the channel, wherein once the first visible satellite has been detected by one of the operating channels, the operation of all the other channels is interrupted via each stop block of said channels, each stop block being controlled by the microprocessor means.

7. A radio-frequency signal receiver, particularly of the GPS type, suitable for implementing the method according to claim 1, the receiver including means for receiving and shaping radio-frequency signals from satellites to generate frequency converted intermediate signals, a correlation stage composed of N correlation channels for receiving the intermediate signals in order to correlate said signals with specific code and carrier frequency replicas of satellites to be searched and tracked, and microprocessor means connected to the correlation stage for processing the data extracted, after correlation, from the radio-frequency signals, wherein each channel of the correlation stage includes a stop block for interrupting the operating channel clock signals, each stop block being controlled by the microprocessor means.

8. The radio-frequency signal receiver according to claim 7, wherein in each channel, a controller, which includes a digital signal processing algorithm, is associated with the correlator for autonomously performing, when the channel is switched on, all the synchronisation tasks for satellite search and tracking independently of the microprocessor means.

9. The radio-frequency signal receiver according to claim 7, wherein the reception and shaping means include a clock signal generator for providing first and second clock signals to each channel of the correlation stage via a stop block of each channel, the frequency of the second clock signal being 16 times less than the frequency of the first clock signal.

10. The radio-frequency signal receiver according to claim 7, wherein the microprocessor means provide interruption signals to the reception and shaping means to periodically interrupt the radio-frequency signal frequency conversion operation.

* * * * *